2 Sheets--Sheet 1.

P. C. PAGETT.
Harvester Rakes.

No. 154,993. Patented Sept. 15, 1874.

Witnesses.
Harry King
Zon P. King

Inventor.
Philip C. Pagett
By his Att'ys
Dodge & Son

2 Sheets--Sheet 2.
P. C. PAGETT.
Harvester Rakes.
No. 154,993. Patented Sept. 15, 1874.
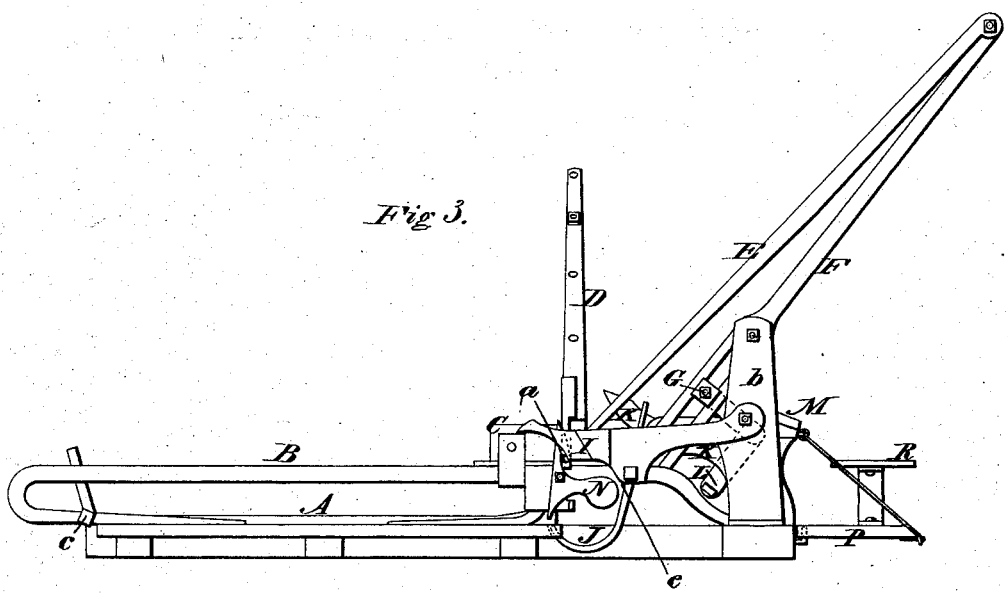
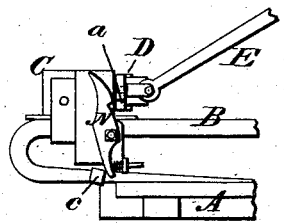
Witnesses.
Harry King.
Wm P King
Inventor.
Philip C. Pagett
By his atty's
Dodge & Son

UNITED STATES PATENT OFFICE.

PHILIP C. PAGETT, OF XENIA, OHIO.

IMPROVEMENT IN HARVESTER-RAKES.

Specification forming part of Letters Patent No. 154,993, dated September 15, 1874; application filed February 1, 1873.

*To all whom it may concern:*

Be it known that I, PHILIP C. PAGETT, of Xenia, in the county of Greene and State of Ohio, have invented certain Improvements in Self-Raking Reapers, of which the following is a specification:

My invention consists in a novel manner of constructing and operating a reciprocating rake, and in a novel arrangement of devices for receiving and delivering the grain from the rake.

Figure 1:
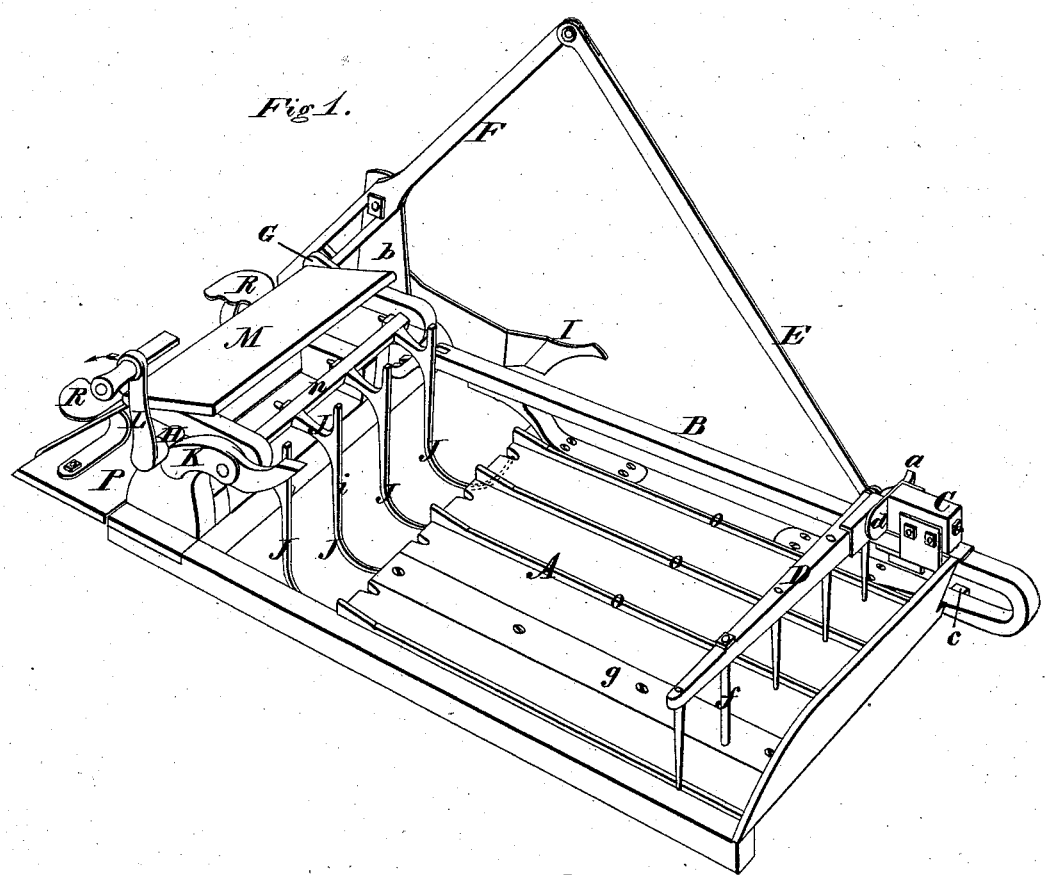
Figure 2:
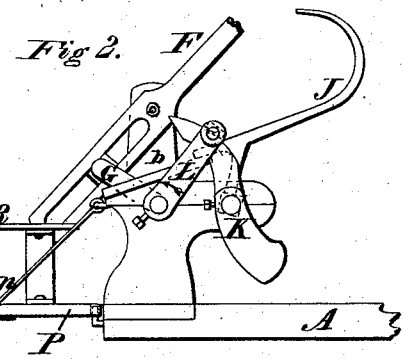

Figure 1 is a perspective view of a harvester-platform having all my improvements applied thereto. Fig. 2 is an end elevation of the receiving and delivering apparatus and the binder's platform. Fig. 3 is a rear elevation of the platform and its attachments represented in Fig. 1, and Fig. 4 is a view of a modified feature.

In carrying out my invention I construct the platform A of the machine in a flat rectangular form, and to its rear side secure a horizontal guide-bar, B, and then mount upon said bar a sliding head-block, C, as shown in Figs. 1 and 3. To the inner end of the head-block I pivot one end of the rake-head D, which extends transversely across the platform, and is provided with depending teeth to carry the grain therefrom. To the head-block C I connect a pitman, E, and then pivot the opposite end of said pitman to an upright lever, F, which latter is pivoted at its middle and slotted in its lower end. Across the frame I mount a revolving shaft, H, having its end provided with a crank, G, which latter I arrange to play in the lower slotted end of the lever F, as shown in Figs. 1, 2, and 3.

When, therefore, the shaft H is set in motion the crank is revolved and caused to vibrate the lever F, which, in turn, operates the pitman E, and carries the head-block and rake back and forth from end to end of the platform. When the rake moves forward it sweeps the grain before it and off over the inner end of the platform, but as it returns or moves backward it rises, so as not to disturb the grain falling on the platform. This elevation of the rake is accomplished by providing its head with an arm, a, which extends out beyond its pivot, and securing to the inner end of the guide-bar B a plate, I, having its end beveled off on the under side, as shown in Figs. 1 and 2, so that as the rake finishes its inward movement its arm a passes under, and is depressed by the beveled plate, so as to tilt the rake up, as shown in Fig. 3. In order to support the rake when thus tilted up, I provide the head-block C with a pivoted weighted catch, N, which engages over the arm a of the rake, as shown in Fig. 3, and holds the same while the rake is moving outward. As the rake completes its outward movement it is released and allowed to fall upon the platform by means of a stud or stop, c, on the outer end of the platform, which serves to trip the catch and release the arm a.

Thus, it will be seen, that as the shaft H revolves, its crank G operates the lever F and pitman E, and causes a continuous reciprocating movement of the rake, that as the rake moves inward it bears on the platform and sweeps the grain therefrom, that at the end of its inward movement it is raised by the arm or plate I, and held by the hook or dog N, that it is held up while moving outward, and that it is then released by the stop c and allowed to fall, preparatory to moving inward again, and so on continuously.

The parts are so arranged that while the rake is moving inward with the grain the crank G works in the lower portion of the slot in lever F, so that it exerts its greatest power, and gives the rake a comparatively slow movement. When, however, the rake is moving outward, and less power is required to operate it, the crank is making the upper half of its revolution, and working in the upper end of the slot close to the pivot of the lever, so that it exerts comparatively little power on the rake, but gives it a very rapid movement.

In the present instance I have pivoted the rake upon the bolt to which the pitman is pivoted; but this may or may not be done, as preferred.

In order to prevent the rake from binding on its pivot, by reason of the lateral strain caused by the resistance of the grain, I provide the head-block with a plate or arm, d, which extends inward, and bears against the side of the rake, as shown in Fig. 1, so as to brace and support the same.

In order to render the engagement of the catch or dog N over the arm *a* certain, the plate I may be provided with an inclined shoulder, *e*, which will move the dog or catch after the rake is raised, as shown in Fig. 3.

Instead, however, of using the weighted catch the weight may be dispensed with, and a spiral spring applied, as shown in Fig. 4; or a spring of any other form applied in any suitable manner.

For the purpose of guiding the rake-teeth close to the platform, and at the same time avoiding danger of their coming in contact therewith, I provide the rake with a metal tooth, *f*, and the platform with a metal bar or plate, *g*, upon which the metal tooth slides when the rake moves forward, as shown in Fig. 1. The metal tooth not only prevents the others from sliding on the platform, but also obviates the danger there would be of their being broken when the rake drops. Lengthwise on the platform I secure a number of strips or bars, O, which serve to support the grain above the surface of the platform, so that the rake-teeth are certain to carry it all off. The inner ends of the strips or bars I incline upward, as shown in Fig. 1, for the double purpose of compressing the grain as it is carried off, and of preventing any of the grain from passing back onto the platform. For the purpose of receiving the grain from the rake, and delivering it upon the binder's table, I mount opposite the inner end of the platform a receiver, J, consisting of a rock-shaft, *n*, provided with a series of curved arms, *i*, which extend downward below the platform, and have their ends turned up into notches in the end thereof, as shown in Figs. 1 and 3. As the rake moves forward it delivers and compresses the grain into the arms of the receiver. On the end of the shaft *n* of the receiver I secure a curved arm, K, and on the forward end of shaft H secure a crank, L, which serves to trip the arm K, and thereby turn the receiver J up, as shown in Fig. 2, so as to discharge the grain therefrom. As soon as the crank passes the arm the receiver falls back to its original position to receive the next supply of grain. In order to prevent the strain and jar that would otherwise occur when the receiver falls, the arm K is provided with a counterweight, which checks somewhat the descent of the receiver. Above the shaft H I mount an inclined binding-table, M, onto which the receiver delivers the grain, the fingers or arms of the receiver being so formed that their upper ends extend over upon the table, as shown in Fig. 2. Behind the binding-table I secure a platform, P, provided with two seats, R, so located that the binders sitting thereon can conveniently bind the grain on the table. The binders' platform is supported at its inner edge by hooks on the frame, and at its outer edge by rods *n*, which are hooked fast to the top of the frame, as shown in Figs. 1 and 2.

When it is not desired to carry the binders on the machine the platform P, table M, and receiver J may be detached, and the machine thereby converted into a simple self-raker.

Having thus described my invention, what I claim is—

1. The combination of the sliding head-block C, the pivoted rake D, having arm *a*, and the catch N, with the arm I, and stop *c*, when arranged to operate as described.

2. In combination with the tilting receiver J, the arm K and crank L, arranged to operate as described.

PHILIP C. PAGETT.

Witnesses:
J. A. SEXTON,
CHARLES DARLINGTON.